United States Patent
Yamada et al.

[11] Patent Number: 5,455,121
[45] Date of Patent: Oct. 3, 1995

[54] STEEL MATERIAL FOR A COLORED SPRING

[75] Inventors: Masao Yamada, Takaishi; Keiji Hattori; Hirofumi Ueki, both of Kobe; Takashi Kubo, Osaka, all of Japan

[73] Assignee: Shinko Kosen Kogyo Kabushiki Kaisha, Hyogo, Japan

[21] Appl. No.: 212,751

[22] Filed: Mar. 11, 1994

[30] Foreign Application Priority Data

Apr. 16, 1993 [JP] Japan ................... 5-090112
Nov. 29, 1993 [JP] Japan ................... 5-298609

[51] Int. Cl.6 ............... B32B 15/18; B32B 15/20
[52] U.S. Cl. ............ 428/659; 428/629; 428/658; 428/677; 428/941
[58] Field of Search ................ 428/607, 659, 428/635, 666, 668, 674, 677, 629, 658, 941

[56] References Cited

U.S. PATENT DOCUMENTS

| | | | |
|---|---|---|---|
| 2,490,700 | 12/1949 | Nachtman | 204/37 |
| 3,634,147 | 1/1972 | Helwig et al. | 148/6.35 |
| 3,778,315 | 12/1973 | Booker et al. | 148/242 |
| 3,966,183 | 6/1976 | Mayer | 267/167 |
| 4,036,206 | 7/1977 | Straub | 428/935 |
| 4,931,317 | 6/1990 | Shima et al. | 427/385.5 |

FOREIGN PATENT DOCUMENTS

| | | |
|---|---|---|
| 0269006 | 1/1988 | European Pat. Off. . |
| 0551566 | 7/1993 | European Pat. Off. . |
| 5-171493 | 7/1993 | Japan . |
| 2076432 | 2/1981 | United Kingdom . |

OTHER PUBLICATIONS

JP-A-57 190 139, Shin Nippon Seitetsu, vol. 7, No. 41 (M-194) (1186), Coated Spring, Nov. 1982 & Feb. 18, 1983.
JP-A-63 026 383, Sawahira K.K., vol. 12, No. 237 (C-509) (3084), Jul. 6, 1988 & Feb. 3, 1988.

Primary Examiner—John Zimmerman
Attorney, Agent, or Firm—Jordan and Hamburg

[57] ABSTRACT

A steel material for colored springs is formed with a metallic deposit on the surface. The metallic deposit contains copper, zinc, and chromium. In an annealing process, copper and zinc diffuse in the deposit to exhibit a gold color tone while chromium is oxidized to exhibit a dark gray color tone. The combination of these color tones exhibits a beautiful black color tone which is distinguishable from a normal spring. The deposit improves the formability in the spring shaping process.

15 Claims, 6 Drawing Sheets

STEEL MATERIAL FOR A COLORED SPRING

BACKGROUND OF THE INVENTION

This invention relates to a steel material for a colored spring, a method for producing a colored spring, and a colored spring.

Springs such as helical springs and plate springs are indispensable parts in assembling a variety of machines. Steel materials for spring are divided roughly into steel wires and steel plates. The steel wires are classified further into hard steel wires, piano wires and stainless steel wires specified in JIS or Japanese Industrial Standard. These basic steels have very similar surface color tone. Particularly, the hard steel wires and the piano wires are indistinguishable only based on the surface color tone.

The stainless steel wires have generally excellent gloss compared to the hard steel wires or the piano wires, and therefore it is not difficult to distinguish the hard steel wires or the piano wires from the stainless steel wires. However, the case that a so-called oil drawing or wet drawing, in which the wire is drawn by applying a tensile force while applying oil to the surface of the wire, is performed to the hard steel wires or the piano wires, these wires exhibit increased gloss. As a result, the hard steel wires or the piano wires become indistinguishable from the stainless steel wires.

The fact that the type of spring is indistinguishable based on the surface color tone as described above will cause the problem that springs which are different in type but similar in shape would be used inadvertently together in the manufacturing process of various machines. Accordingly, the springs are colored to avoid this problem.

FIGS. 5A and 5B show conventional coloring methods in producing springs. As shown in these figures, the conventional methods for coloring spring can be classified roughly into the method A shown in FIG. 5A according to which the coloring is applied before springs are formed and the method B shown in FIG. 5B according to which the coloring is applied after springs are formed.

More specifically, according to the conventional method A, the basic steel is first colored. Subsequently, a wire drawing is applied in the case that the basic steel is a steel wire, whereas a rolling is applied in the case that the basic steel is a steel sheet. The basic steel which has been colored and drawn/rolled are then shaped into springs using a specified shaping apparatus. Thereby, intermediate products can be obtained. These intermediate products are made into springs through a process of annealing the intermediate products loaded in an annealing furnace at a specified temperature. According to this method, the basic steel is already colored before being formed.

According to the conventional method B, the basic steel is plated or lubricated, but is not yet colored, before being formed. Then, similar to the conventional method A, after a drawing or rolling is performed, a specified shaping operation is performed in a shaping process. In this way, intermediate products in the form of springs can be obtained. These intermediate products are annealed and then colored. As a coloring method, either a chemical conversion treatment or color plating treatment is performed.

In the conventional method A, there can be specifically used, as a coloring method, a resin coating method of coating the surface of the basic steel with special resin, a baking finish method of baking paint on the surface thereof. In the conventional method B, a chemical conversion treatment for treating the basic steel with chemicals and an electroplating treatment can be used as a coloring method.

Incidentally, as a color tone of the final spring, black is in many cases particularly preferably adopted in order to coincide the surface color tone with the black base color tone or to meet a demand in design. Both the electroplating treatment and the chemical conversion treatment are applicable to make springs black. Specifically, a black chromium plating treatment, a black nickel plating treatment, a black rhodium plating treatment and the like are used as an electroplating treatment. A black chromate method and a black oxide finish method are used as a chemical conversion treatment.

However, the steel material for springs is subjected to an exceedingly large abrasion from a variety of shaping machine tools during the shaping process. Accordingly, coatings and paints are often scratched or peeled by the large abrasion, if the basic steel is colored according to the conventional method A in which the coloring is performed by coating with resin or painting before the shaping process.

Normally, the springs are heated at a temperature of 250° to 400° C. for 2 to 30 minutes in order to improve the spring characteristic (a low temperature annealing treatment). Thus, even if scratches made by the abrasion is of a slight degree, the coats or paints fuse during this heating treatment, causing the springs to stick to each other. As a result, recesses are undesirably formed on the outer circumferential surfaces of the springs through the softening and fusing of the coats.

Further, there is sometimes employed a shaping apparatus provided with a detector for detecting the size of a spring using an electric signal during the shaping process. In order to employ such a shaping apparatus, the surface of the steel material must be in a conductive state. When the surface of the steel material is covered with a coating or paint layer, it is brought into an insulated state. Thus, the shaping apparatus provided with the detector cannot be used.

For the aforementioned reasons, it has been problematic to color the surface of the basic steel using the conventional method A. On the other hand, the conventional method B has the problem of increasing the production costs since a cumbersome treatment, e.g., a chemical conversion treatment or color plating treatment, must be performed to color the intermediate products that have passed through the annealing process.

SUMMARY OF THE INVENTION

It is an object of the present invention to provide new steel material which can assure production of colored springs without causing the problems of the prior art.

It is another object of the present invention to provide a steel material which can assure production of colored springs having a beautiful black color tone without providing a coloring process either before a shaping process or after an annealing process but only by carrying out a conventional and normal way of spring production.

It is another object of the present invention to provide a new colored spring which has a beautiful black color tone and does not need high production costs.

It is another object of the present invention to provide a new colored spring production method which can produce colored springs at reduced costs.

Accordingly, the invention is directed to a steel material for colored springs comprising a basic steel, and a metallic deposit formed on a surface of the basic steel, the metallic deposit having a metal capable of forming an oxide that comes to have a desired color tone by heating.

This steel material is provided with a deposit of such metal on the surface thereof. The steel material is shaped to a spring and then annealed or heated to exhibit a desired color tone on the surface. Accordingly, this steel material can eliminate the coloring process which has been required in the conventional spring production way.

Also, the deposit serves as a buffer between a spring shaping apparatus and the basic steel. The formability of springs can be improved. Further, the deposit is conductive because of being made of metal. Accordingly, this steel material can assure use of a detector for detecting the size of springs through application of electricity to the springs.

Also, it may be appreciated that the metallic deposit is made of metal including copper, zinc, and chromium.

Further, it may be preferable that the metallic deposit is formed by two layers, one layer being made of a metal including either copper or zinc, and the other layer being made of a metal including chromium.

Further, it may be preferable that the inner layer of the two-layer deposit being made of copper and the outer layer being made of zinc/chromium alloy, or alternatively the inner layer being made of zinc and the outer layer being made of copper/chromium alloy.

With the steel material formed with the deposit including copper, zinc, and chromium, when being heated, copper and zinc diffuse in the deposit to thereby exhibit a so-called gold color tone. On the other hand, the chromium is oxidized to form a chromium oxide. The chromium oxide, e.g., $Cr_2O_3$, exhibits a dark gray color tone. Accordingly, the combination of the gold color tone of copper and zinc and the dark gray color tone of chromium oxide make the deposit as a whole exhibit a beautiful black tone.

Specifically, in the deposit including copper, zinc, and chromium, these metals diffuse with one another in the deposit and the chromium oxide is formed during an annealing process. As a result, the deposit exhibit a beautiful black tone, thereby making the obtained spring look beautiful.

Further, the chromium oxide, which is formed as a result of heating, prevents rusting of the spring effectively.

Further, the deposit formed by two layers, the inner layer of copper or zinc and the outer layer of zinc/chromium or copper/chromium alloy, can exhibit a more beautiful black tone. This is because: 1) chromium of the zinc/chromium or copper/chromium arranged on the outer layer is more easily oxidized to form chromium oxide; and 2) the arrangement of the dark gray color tone on the outer layer and the gold color tone on the inner layer exhibits a more beautiful black color tone.

It may be preferable t ha t the deposit has 0.2 to 80.0 weight percent of copper, 0.2 to 10.0 weight percent of chromium. The deposit satisfying the above ranges, when being heated during the annealing, provides more black color tone, thereby making the springs look beautiful.

Also, it may be preferable that the metallic deposit has a thickness of 0.1 to 15 μm.

Furthermore, the present invention is further directed to a method for producing a colored spring which comprises the steps of forming the above-mentioned metallic deposit on a surface of a basic steel, shaping the basic steel into an intermediate product having a specified springlike form, and annealing the intermediate product at a temperature range of 200° to 500° C. to cause the deposit to have a black color tone.

This method can produce a colored spring having a beautiful black tone on the surface thereof without providing an additional coloring process.

Moreover, the present invention is further directed to a colored spring produced by shaping a basic steel provided with the above-mentioned metallic deposit to an intermediate product having a specified springlike form, and annealing the intermediate product at a temperature range of 200° to 500° C. to cause the deposit to have a black color tone.

This colored spring has a beautiful black color tone on the surface because the metallic deposit contains copper, zinc, and chromium, and is heated within the temperature range of 200° to 500° C.

The above and other objects, features and advantages of the present invention will become more apparent upon a reading of the following detailed description and drawings.

DETAILED DESCRIPTION OF THE PREFERRED EXAMPLES OF THE INVENTION

The present invention has been worked out by earnest researches of the inventors. It has been found out that the plating causes no change in the spring characteristic of steel material for springs and that a deposit of specific alloy formed on the surface of the steel material starts assuming a black color tone while being annealed at a low temperature. The invention is principally realized by forming on a surface of a basic steel a deposit of a metal which forms an oxide coating when being heated, and exhibits a desired color tone.

Figure 1:
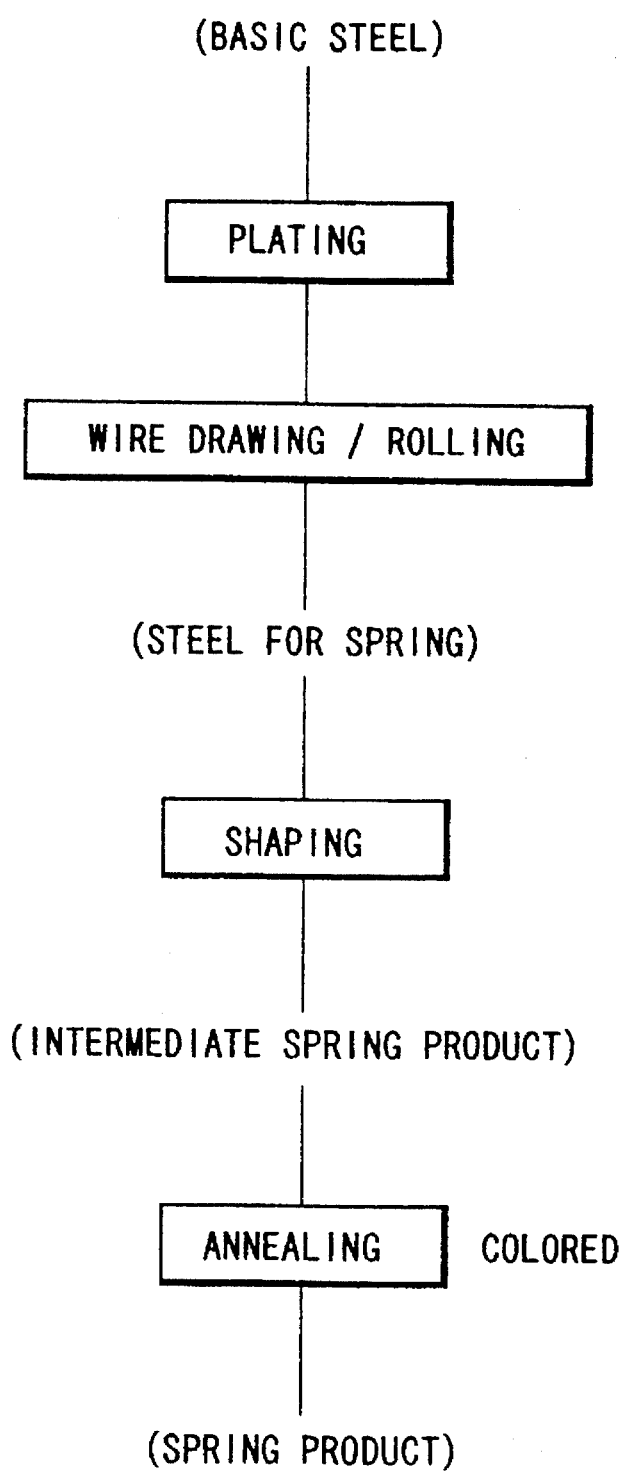
FIG. 1 is a flow chart showing an exemplary spring producing method according to the invention.

An exemplary spring producing method according to the invention will be described with reference to FIG. 1. First, the basic steel is plated. This plating treatment can be applied to a basic steel wire for springs, such as hard steel wire, piano wire and stainless steel wire, or a variety of steel plates for springs. As a deposit metal used for the plating treatment selected is a metal which is capable of exhibiting a specified color tone after being heated.

The deposit metal exhibits a specified color tone during the annealing treatment which is to be performed later. The basic steel applied with such metallic deposit is formed into a wire by drawing or into a plate by rolling. This steel material is shaped into a specified spring form using a shaping apparatus in a subsequent shaping process. In this case, although the steel material is subjected to an exceedingly large abrasion during the shaping process, the deposit formed on the surface thereof functions as a lubricant so that the steel material can be worked smoothly in the shaping apparatus. Thus, a satisfactory formability is attainable even without applying any lubricant unlike the conventional method B.

An intermediate product obtained after the shaping process is heated at a specified temperature to anneal during a subsequent annealing process, and finally produce a spring. The metallic deposit on the surface of the intermediate product produces a specified color tone under heat during the annealing process.

In this way, colored springs are produced in the same producing way as non-colored spring production, that is, without additional processes. Accordingly, colored springs can be produced efficiently and at reduced costs.

Further, the producing of springs using this steel material eliminates the problem residing in the conventional method A that the paint coat formed on the surface of the basic steel in the coloring process is liable to peel off during the subsequent shaping process. This allows the surface of the finished spring to be beautiful and smooth.

Further, the use of this steel material obviates the treatment of coloring the spring, which are necessary for the conventional method B, after the intermediate product is annealed, thereby reducing the production costs.

In this embodiment, the metallic deposit is made of two-layers: the inner layer being made of copper and the outer layer being made of zinc/chromium alloy, or alternatively the inner layer being made of zinc and the outer layer being made of copper/chromium alloy.

However, it should be noted that the present invention is not limited to the above-mentioned two-layer deposit. It may be appreciated to form a single layer deposit including at least the three elements, copper, zinc, and chromium. Also, it may be appreciated to form a two-layer deposit whose one layer is made of copper/chromium or zinc/chromium, and whose the other layer is made of zinc/chromium or copper chromium.

Next, appropriate or preferable element proportions, thickness, annealing temperature of deposit will be described with reference to FIGS. 2 to 4.

Figure 2:
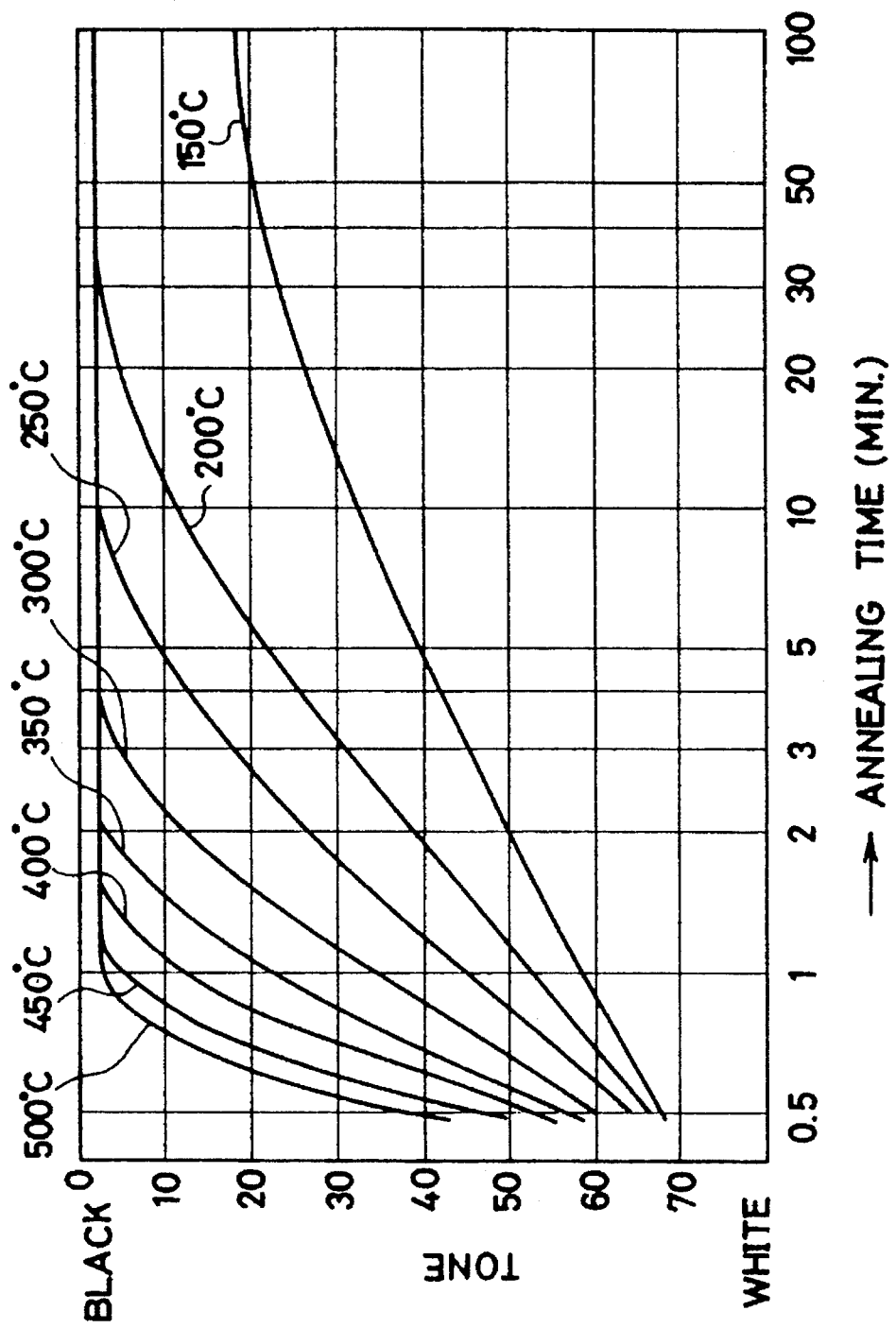
FIG. 2 is a semilogarithmic graph showing the relationship between annealing temperature (°C.), annealing time (min.), and color tone in a low temperature annealing.

FIG. 2 is a semilogarithmic graph showing the relationship between annealing temperature (°C), annealing time (min.) and color tone formed in a low-temperature annealing treatment.

This graph was made as follows: First, a hard steel wire was formed with a two-layer deposit, the inner layer being made of copper and the outer layer being made of zinc/chromium alloy. The hard steel wire was drawn at a reduction ratio greater than 50 percent and then annealed. The deposit had 65 weight percent of copper, 5 weight percent of chromium, and 30 weight percent of zinc. The drawn hard steel wire had a final deposit thickness of 0.5 µm. A number of test pieces were prepared. The annealing temperature and time were changed for each test piece. The color tone of each test piece was measured by a digital colormeter "TC-3600" which is a product of Tokyo Denshoku Kabushiki Kaisha, a Japanese company.

As will be seen from this graph, change in the color tone is closely related to the annealing temperature and the annealing time. It will be seen that a desired change to black color tone occurred in a range of the annealing temperature from 200° to 500° C. for a short annealing time, that is, 1.0 to 30 minutes. At an annealing temperature of not higher than 200° C., however, the surface of the test piece did not change its color tone greatly even if being annealed for a substantially long time. Further, the black color tone was not attained even if being annealed for a much longer time. Also, an annealing temperature of not lower than 500° C. deteriorated the strength of the spring and therefore it is not practical to anneal at such a high temperature. Based on the above test result, accordingly, it will be apparent that setting the annealing temperature within the range of 200° to 500° C. is practical or preferable.

Figure 3:
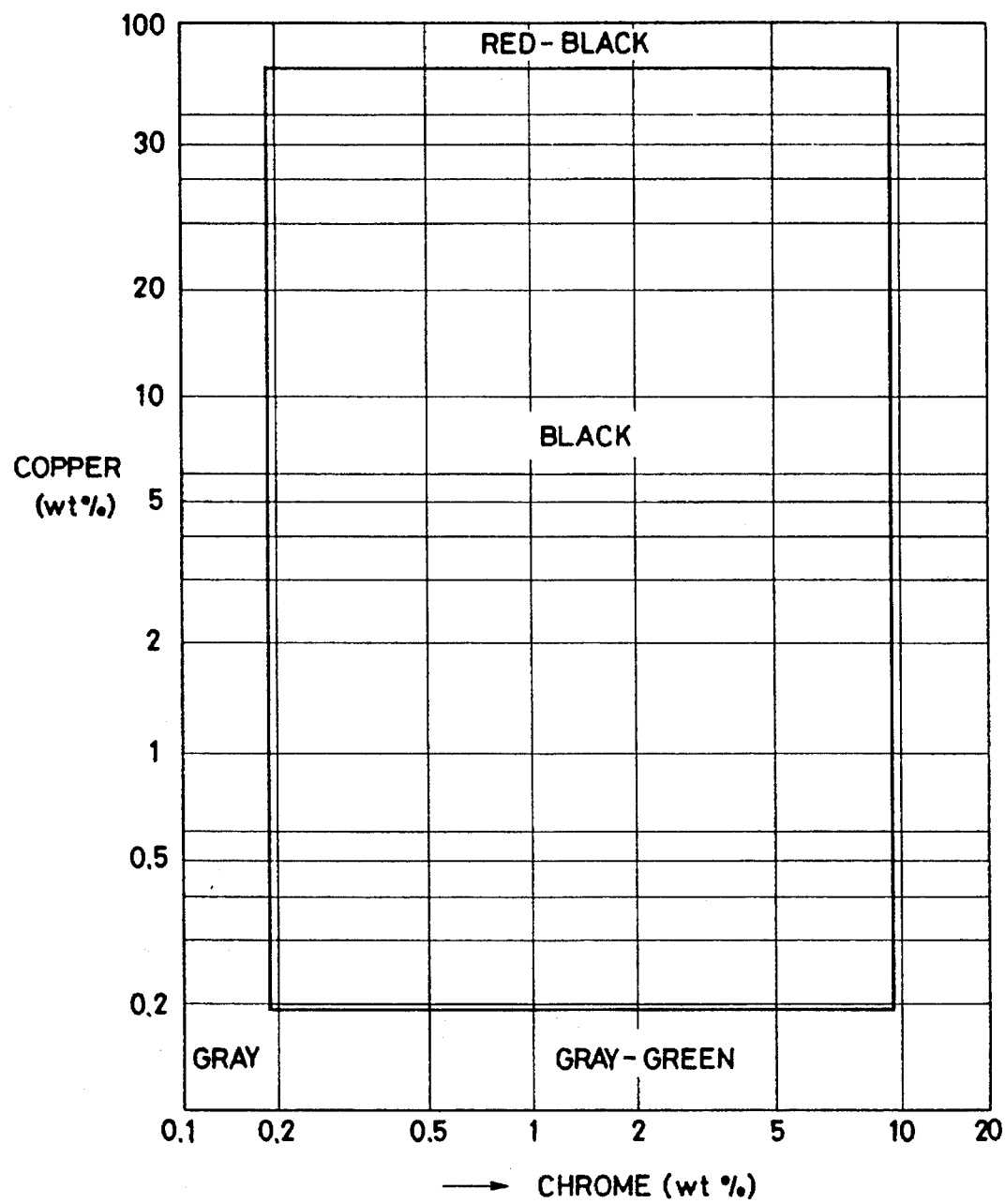
FIG. 3 is a logarithmic graph showing a region where a black color tone is obtainable based on the relationship between copper amount (weight percent) and chromium amount (weight percent) in a formed deposit.

FIG. 3 is a logarithmic graph showing a range where a black color tone is obtainable based on the relationship between copper amount (weight percent) and chromium amount (weight percent) in a deposit. This graph also shows a range of proportions of copper and chromium at which a black color tone produced in the annealing treatment. A horizontal axis of this graph represents the chromium amount (weight percent) and a vertical axis represents the copper amount (weight percent).

This graph was made as follows: A number of basic steel wires were formed with deposits having different proportion of zinc, copper, and chromium. The plated steel wire was drawn at a reduction ratio greater than 50 percent so that the final thickness of the deposit is 0.5 µm. The drawn steel wire was shaped into a spring and then annealed at a temperature of 350° C. for 10 minutes.

As shown in this graph, the deposit produced a gray color tone when the chromium amount was smaller than 0.2 weight percent. Also, no uniform deposit could be formed when the chromium amount was 10 weight percent or greater.

The deposit produced a gray-green color tone when the copper amount was smaller than 0.2 weight percent. Also, a red-black color tone produced when the copper amount was 80 weight percent or greater. In both color tones, the spring does not look beautiful.

Accordingly, it will be seen that a beautiful black color tone is obtainable when the deposit is within the rectangular range indicated in the graph, that is, the chromium amount being 0.2 to 10 weight percent, the copper amount being 0.2 to 80 weight percent.

Figure 4:
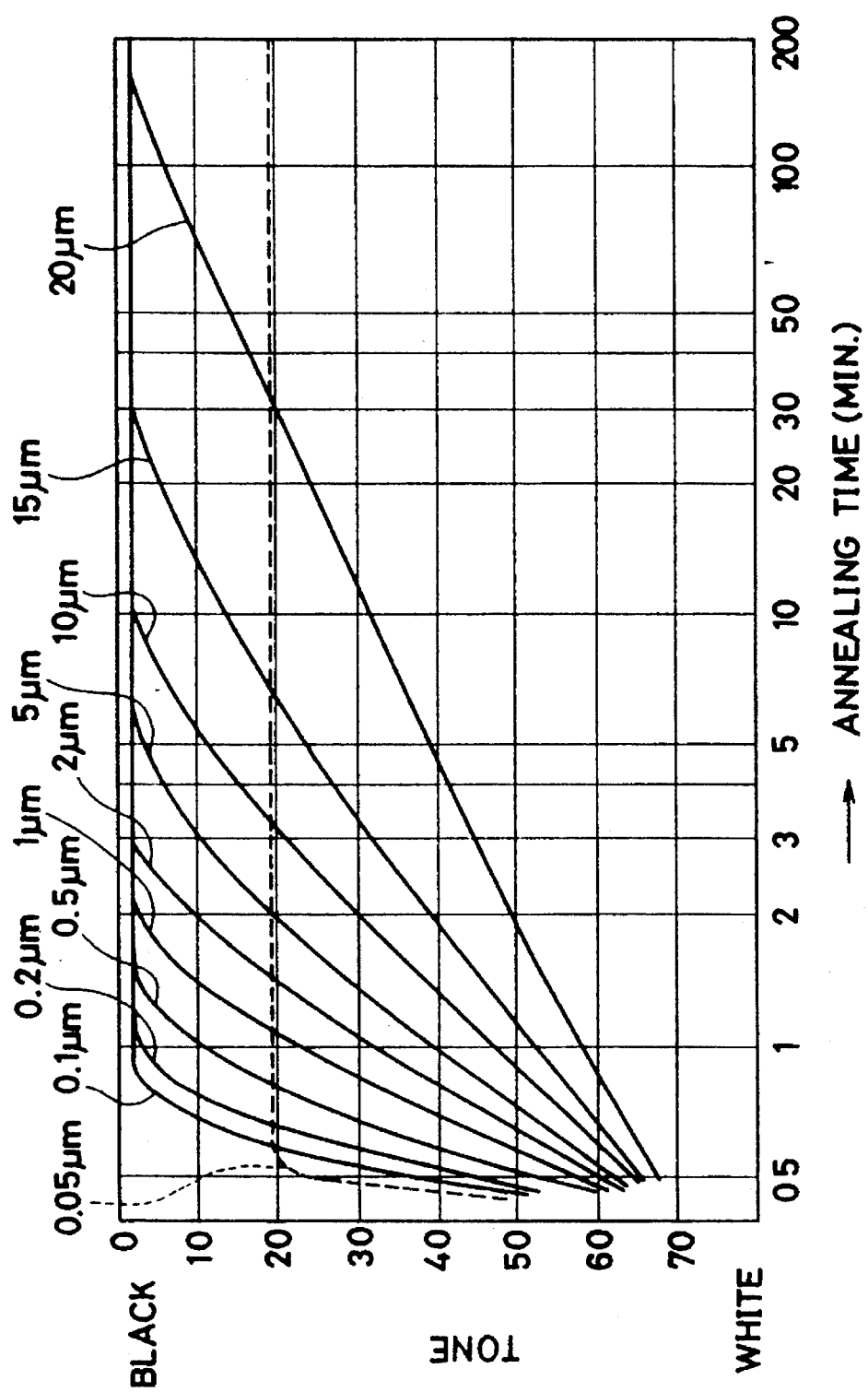
FIG. 4 is a semilogarithmic graph showing the relationship between deposit thickness (μm), annealing time (min.), and color tone.
Figure 5A:
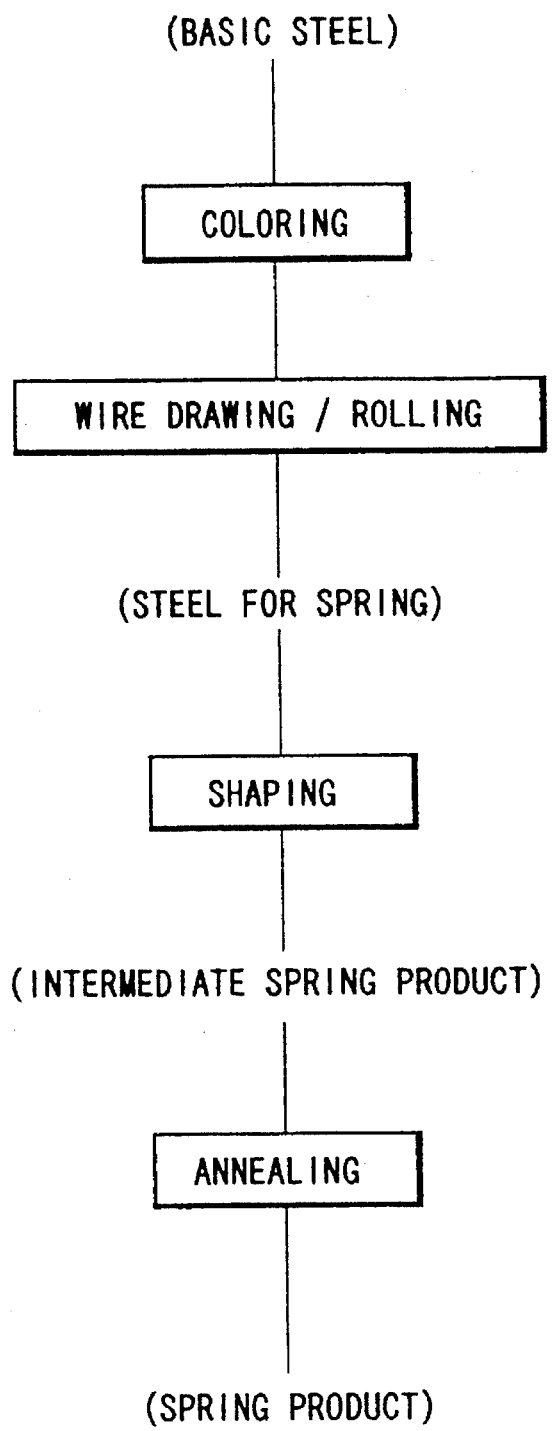
FIGS. 5A and 5B are flow charts showing conventional spring producing methods A and B respectively.
Figure 5B:
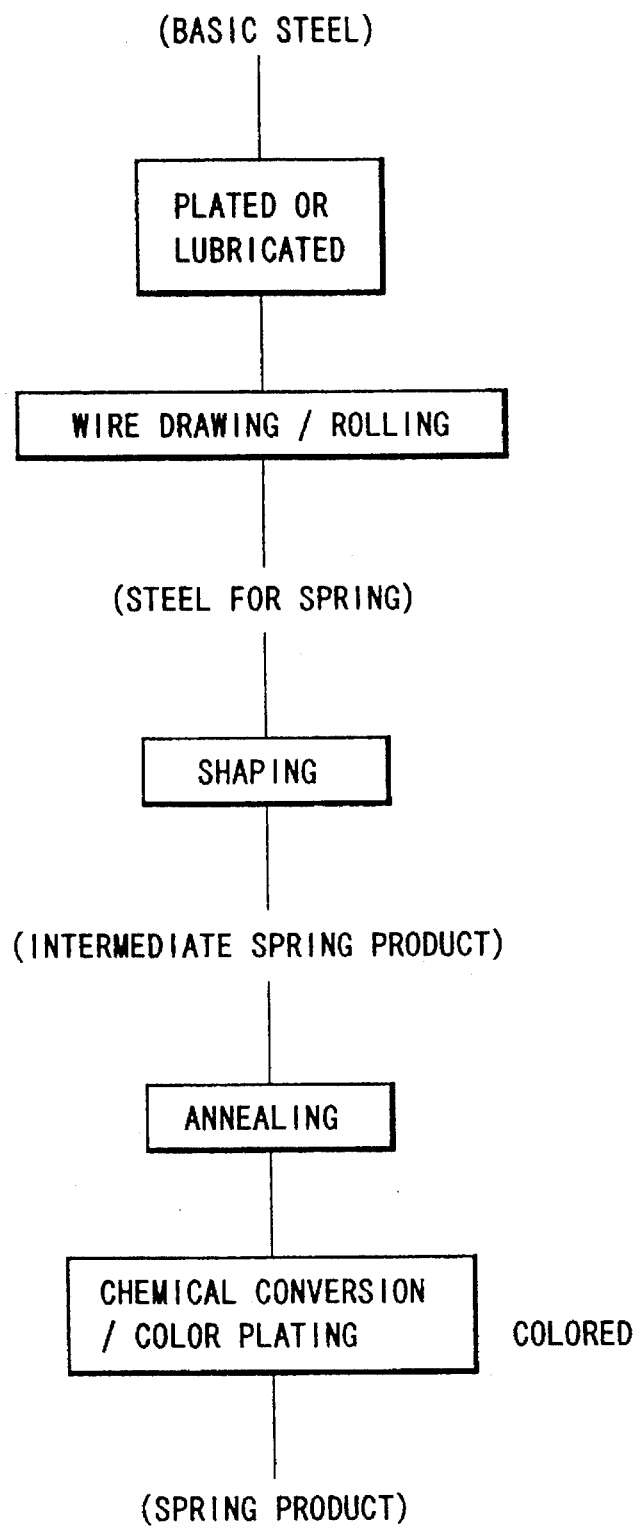

FIG. 4 is a semilogarithmic graph showing the relationship between deposit thickness (µm), annealing time (min.) and color tone formed in a low temperature annealing treatment.

This graph was made as follows: First, a number of basic steel wires were plated to have two layers, the inner layer being made of copper, the outer layer being made of zinc/chromium alloy. The proportions of the copper, chromium, and zinc of the deposit were respectively 65, 5, and 30 weight percent. The steel wire was drawn so that the deposit it thickness became 0.05 to 20 µm. The steel wire was shaped into a spring which was then annealed at 400° C. This graph shows a result obtained by checking the color tone of the springs. A horizontal axis of this graph represents the annealing time and a vertical axis thereof represents the color tone.

As will be seen from this graph, in the case of the deposit thickness being smaller than 0.1 µm. the desired color tone was not realizable even if the annealing time was changed anyway. However, in the case of the deposit thickness being 0.1 µm or greater, when the annealing was performed for longer than a specified time, the deposit remained uniform and produced a beautiful black color tone.

Also, it will be seen that the time required for the deposit to become black increases exponentially as the deposit thickness increases. For example, it took 30 minutes for the 15 μm-deposit to become black, but it took 180 minutes for the 20 μm-deposit.

As will be seen from FIG. 2, the higher the annealing temperature, the more drastically the color tone changes, i.e., the shorter time it takes for the deposit to become black. However, a practical annealing temperature for springs is 250° to 400° C. and springs are seldom annealed at a temperature higher than 400° C.

Accordingly, it will be seen from the graphs of FIGS. 2 and 4 that the deposit thickness which assures the black color tone change at the practically highest annealing temperature of 400° C. for the practically longest annealing time of 30 minutes is 15 μm. The graph of FIG. 4 shows the fact that the deposits having a thickness smaller than 15 μm exhibited the black color tone for shorter than 30 minutes. The tone of black color can be desirably changed by controlling the annealing time and the deposit thickness suitably. Also, it is disadvantageous to form a deposit having a thickness greater than 15 μm because it leads to an increase in the production costs.

Accordingly, it will be preferable to form a deposit having a thickness of 0.1 to 15 μm.

Next, characteristic performances of the present invention will be described by a comparison between a spring (Present Example 1) which is formed with a deposit according to the present invention and a spring (Comparative Example 1) which is not formed with any deposit.

As a basic steel wire employed was a hard steel wire whose carbon content 0.82 weight percent and whose diameter is 1.80 mm. This basic steel wire was lead-patented and washed with acid to remove scale therefrom. The electroplating treatment was applied to the descaled basic steel wire to form a two layer deposit; the inner layer being made of copper and the outer layer being made of zinc/chromium alloy.

For the copper plating treatment, a plating solution whose composition was: $CuSO_4 \cdot 5H_2O$:240 g/l, $H_2SO_4$:50 g/l, was used at 30° C. A copper plate was used as an anode and a current density was set at 5 A/dm².

On the other hand, for the zinc/chromium plating treatment, a plating solution whose composition was $ZnSO_4 \cdot 7H_2O$:110 g/l, $Cr_2(SO_4)3H_2O$:1 to 50 g/l, $Na_2SO_4 \cdot 10H_2O$:50 g/l, was used at 50° C. and was prepared so that the pH thereof was 4. A zinc plate was used as an anode and a current density was set at 5 to 30 A/dm².

The precipitation of chromium is adjusted by changing the trivalent Cr-ion concentration in the plating solution and the current density, and the basic wire was formed with the deposit of copper on the inner layer and zinc/chromium alloy on the outer layer which has 5 weight percent of copper, 5 weight percent of chromium, and 90 weight percent of zinc. The thickness of the deposit was set at 0.5 μm after the wire drawing.

After the formation of the two layer deposit, the wire was drawn continuously eight times at a drawing ratio of 88.9 percent in the cross sectional area so that its diameter became 0.60 mm. In this way, there was obtained a steel wire (steel material for springs) whose strength level was equivalent to a C-type hard steel wire specified in As Comparative Example 1, a steel wire having a diameter of 0.60 mm was obtained by drawing the basic wire having a diameter of 1.80 mm similarly to the case of Present Example 1 without forming any deposit.

These steel wires were shaped into a helical spring (intermediate products) whose outside diameter was 10 mm, whose length was 20 mm, and whose number of winding was 20. Thereafter, these springs were annealed at 300° C. for 10 minutes and the color tones thereof were compared after being cooled.

To measure the mechanical characteristics of each of Present and Comparative Examples, further, there were prepared another steel wire which was kept straight, that is, not shaped into a spring, and was annealed similarly. These straight steel wires were measured for the tensile strength, torsional characteristic and fatigue strength. The fatigue strength was measured in accordance with Nakamura Rotary Bending Test.

TABLE-1 below shows preconditions and test results.

TABLE-1

| | PRECONDITIONS | | | | | |
|---|---|---|---|---|---|---|
| | WIRE | DEPOSIT | COMPOSITION OF PLATING SOLUTION | | | ANNEALING CONDITION |
| | DIAM. (mm) | THICKNESS (μm) | Cu (wt %) | Zn (wt %) | Cr (wt %) | TEMP (°C.) | TIME (min) |
| Present Example 1 | 0.60 | 0.5 | 5.0 | 90.0 | 5.0 | 300 | 10 |
| Comparative Example 1 | 0.60 | — | — | — | — | 300 | 10 |

| | TEST RESULTS | | | | | |
|---|---|---|---|---|---|---|
| | COLOR TONE | | TENSILE STRENGTH | TORSIONAL CHARA. | | FATIGUE STRENGTH |
| | (A) | (B) | (N/mm²) | (C) | (D) | (N/mm²) |
| Present Example 1 | WHITE | BLACK | 2,250 | 27 | GOOD | 620 |
| Comparative Example 1 | WHITE | WHITE | 2,260 | 27 | GOOD | 622 |

(A), (B), (C), (D) denote color tone before heating, color tone after the heating, number of rotary bending, and state of surface respectively.

As seen from TABLE-1, the surface of Present Example 1 which was originally white, changed into a beautiful black color tone which is distinguishable color tone. Contrary to this, the color tone of the spring of Comparative Example 1 remained white which is normal or undistinguishable color tone.

No big difference was found between these springs in terms of the tensile strength, torsional characteristic and fatigue strength. The comparison made in these springs' easiness for coiling showed that the spring according to the invention has a better formability because the plating treatment was applied thereto. Thus, the forming operation could be performed stably, which led to a smaller variation in pitches and a better easiness for coiling.

Further, another comparison was made. In this comparison, a stainless steel spring wire was employed as basic steel wire. The stainless steel spring wire was bright-annealed at 1150° C., and had a diameter of 2.5 mm. The electroplating treatment was applied to the basic wire to form a two layer deposit, similarly to Present Example 1, including the inner layer being made of zinc and the outer layer being made of copper/chromium alloy. Also, the deposit had 30 weight percent of zinc, 5 weight percent of chromium. Thus plated wire was drawn into a steel wire whose diameter was 1.0 mm and whose deposit thickness was 0.5 μm.

The plating conditions were as follows. For the zinc plating treatment, a plating solution whose composition was: $ZnSO_4 7H_2O$:110 g/l, $H_2SO_4$:50 g/l, was used at 30° C. A zinc plate was used as an anode and a current density was set at 5 A/dm².

On the other hand, for the copper/chromium plating treatment, a plating solution whose composition was:

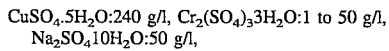

$CuSO_4 .5H_2O$:240 g/l, $Cr_2(SO_4)_3 3H_2O$:1 to 50 g/l, $Na_2SO_4 10H_2O$:50 g/l, was used at 50° C. and was prepared so that the pH thereof was 4. A copper plate was used as an anode and a current density was set at 5 to 30 A/dm². The precipitation of chromium is adjusted by changing the trivalent Cr-ion concentration in the plating solution and the current density.

The steel wire has a strength equivalent of a stainless steel spring wire WPB specified in JISG4314. Similar to Present Example 1, this steel wire was shaped into a helical spring and then annealed at 350° C. for 10 minutes.

Comparative Example 2 was prepared by shaping the same stainless steel wire into a helical spring in the same manner as Present Example 2. However, the plating treatment was not applied.

Similar comparison tests were conducted. TABLE-2 below shows preconditions and test results.

TABLE-2

| | PRECONDITIONS | | | | | |
|---|---|---|---|---|---|---|
| | WIRE | DEPOSIT | COMPOSITION OF PLATING SOLUTION | | | ANNEALING CONDITION |
| | DIAM. (mm) | THICKNESS (μm) | Cu (wt %) | Zn (wt %) | Cr (wt %) | TEMP (°C.) | TIME (min) |
| Present Example 2 | 1.00 | 0.5 | 65.0 | 30.0 | 5.0 | 350 | 10 |
| Comparative Example 2 | 1.00 | — | — | — | — | 350 | 10 |

| | TEST RESULTS | | | | | |
|---|---|---|---|---|---|---|
| | COLOR TONE | | TENSILE STRENGTH | TORSIONAL CHARA. | | FATIGUE STRENGTH |
| | (A) | (B) | (N/mm²) | (C) | (D) | (N/mm²) |
| Present Example 2 | WHITE | BLACK | 1,970 | 10 | GOOD | 300 |
| Comparative Example 2 | WHITE | WHITE | 1,980 | 9 | GOOD | 310 |

(A), (B), (C), (D) denote color tone before heating, color tone after the heating, number of rotary bending, and state of surface respectively.

As seen from TABLE-2, similar to the preceding comparison, the surface of Present Example 2, which was originally white, changed into a beautiful black color tone which was clearly distinguishable from normal springs. Contrary to this, the color tone of Comparative Example 2 remained white and thus it was impossible to distinguish this spring from non-colored springs.

No big difference was found between these springs in terms of the tensile strength, torsional characteristic and fatigue strength.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A steel material for a black colored spring comprising:
   a base steel to be annealed; and
   a metallic deposit formed on a surface of said base steel, said metallic deposit comprising an inner and an outer layer, said inner layer comprising copper, said outer layer comprising zinc and chromium, said metallic deposit being capable of forming a first portion and a second portion during the time that said base steel is being annealed, said first portion being above said second portion, said first portion comprising chromium, oxide having a dark gray color tone, said chromium being transformed into said first portion of chromium oxide during said annealing, said second portion comprising copper and zinc having a gold color tone, said copper and zinc diffusing into said second portion during said annealing, said gray color tone of said first portion and said gold color tone of said second portion combining to exhibit a black color tone.

2. A steel material according to claim 1 wherein said annealing is carried out at a temperature of 200° to 500° C.

3. A steel material according to claim 2 wherein said annealing is carried out for 1.0 to 30 minutes.

4. A steel material according to claim 1 wherein said metallic deposit has a thickness of 0.1 to 15 μm.

5. A steel material as defined in claim 1, wherein said metallic deposit has 0.2 to 80.0 weight percent of copper and 0.2 to 10.0 weight percent of chromium.

6. A steel material for making a spring having a black color tone, said steel material having the property of being capable of being mechanically shaped into said spring and being annealed after having been mechanically shaped, said steel material having a metallic deposit on a surface thereof, said metallic deposit comprising an inner layer and outer layer, said inner layer comprising copper said, outer layer comprising a zinc/chromium alloy, said metallic deposit having the property of being transformed into two portions during said annealing with one of said portions being an inner portion of copper and zinc having a gold color tone and the other of said portions being an outer portion comprised of chromium oxide having a dark gray color tone with said gold color tone and said gray color tone together combining to make the spring have a black color tone.

7. A steel material according to claim 6 wherein said annealing is carried out at a temperature of 200° to 500° C.

8. A steel material according to claim 7 wherein said annealing is carried cut for 1.0 to 30 minutes.

9. A steel material according to claim 6 wherein said metallic deposit has a thickness of 0.1 to 15 μm.

10. A steel material for a black colored spring comprising:
   a base steel to be annealed; and
   a metallic deposit formed on a surface of said base steel, said metallic deposit comprising an inner and outer layer, said inner layer comprising zinc, said outer layer comprising copper and chromium, said metallic deposit, being capable of forming a first portion and a second portion during the time that said base steel is being annealed, said first portion being above said second portion, said first portion comprising chromium oxide having a dark gray color tone, said chromium being transformed into said first portion of chromium oxide during said annealing, said second portion comprising copper and zinc having a gold color tone, said zinc and copper diffusing into said second portion during said annealing, said gray color tone of said first portion and said gold color tone of said second portion combining to exhibit a black color tone.

11. A steel material according to claim 10 wherein said annealing is carried out at a temperature of 200° to 500° C.

12. A steel material according to claim 11 wherein said annealing is carried out for 1.0 to 30 minutes.

13. A steel material according to claim 10 wherein said metallic deposit has a thickness of 0.1 to 15 μm.

14. A steel material according to claim 10, wherein said metallic deposit has 0.2 to 80.0 weight percent of copper and 0.2 to 10.0 weight percent of chromium.

15. A steel material for making a spring having a black color tone, said steel material having the property of being capable of being mechanically shaped into said spring and being annealed after having been mechanically shaped, said steel material having a metallic deposit on a surface thereof, said metallic deposit comprising an inner layer and an outer layer, said inner layer comprising zinc, said outer layer comprising a copper/chromium alloy, said metallic deposit having the property of being transformed into two portions during said annealing with one of said portions being an inner portion of copper and zinc having gold color tone and the other of said portions being an outer portion comprised of chromium oxide having a dark gray color tone with said gold color tone and said gray color tone together combining to make the spring have a black color tone.

* * * * *